(12) United States Patent
Hazen

(10) Patent No.: US 12,234,385 B2
(45) Date of Patent: Feb. 25, 2025

(54) SURFACTANT, DISPERSION AND ADHESIVE COMPOSITION

(71) Applicant: LAWTER, INC., Chicago, IL (US)

(72) Inventor: John Hazen, Spaubeek (NL)

(73) Assignee: LAWTER, INC., Chicago, IL (US)

( * ) Notice: Subject to any disclaimer, the term of this patent is extended or adjusted under 35 U.S.C. 154(b) by 0 days.

(21) Appl. No.: 18/018,197

(22) PCT Filed: Jun. 3, 2021

(86) PCT No.: PCT/US2021/035648
§ 371 (c)(1),
(2) Date: Jan. 26, 2023

(87) PCT Pub. No.: WO2022/026055
PCT Pub. Date: Feb. 3, 2022

(65) Prior Publication Data
US 2023/0212436 A1    Jul. 6, 2023

(30) Foreign Application Priority Data

Jul. 27, 2020  (EP) .................................... 20187854

(51) Int. Cl.
*C09J 11/08*   (2006.01)
*C09F 1/04*    (2006.01)
*C09J 7/38*    (2018.01)

(52) U.S. Cl.
CPC ............... *C09J 11/08* (2013.01); *C09F 1/04* (2013.01); *C09J 7/383* (2018.01); *C09J 7/385* (2018.01); *C09J 2203/334* (2013.01); *C09J 2301/408* (2020.08); *C09J 2407/00* (2013.01); *C09J 2409/00* (2013.01); *C09J 2411/00* (2013.01); *C09J 2433/00* (2013.01); *C09J 2493/00* (2013.01)

(58) Field of Classification Search
CPC ... C09J 11/08; C09J 7/385; C09J 7/383; C09J 2301/408; C09J 2203/334; C09J 2407/00; C09J 2409/00; C09J 2411/00; C09J 2433/00; C09J 2493/00; C09F 1/04
See application file for complete search history.

(56) References Cited

U.S. PATENT DOCUMENTS 5,552,519 A * 9/1996 Hemmings ............ C09K 23/00
                                                            156/332
2005/0203228 A1* 9/2005 Aarts ...................... C08K 5/10
                                                            524/306

FOREIGN PATENT DOCUMENTS

| EP | 0296729 A1 | 12/1988 |
| WO | 9412272 A1 | 6/1994 |
| WO | 2005077996 A1 | 8/2005 |
| WO | 2014200567 A1 | 12/2014 |

OTHER PUBLICATIONS

Chinese Official Action dated Dec. 21, 2024 for corresponding Chineses application 202180058363.9.
Juying Zhou et al., Surface Properties and Structural Transformation Behaviors of Mpeg-Maleic Rosin Copolymer in Water, Polymers, 2017, pp. 1-13, vol. 9, MDPI, Basel, Switzerland.

* cited by examiner

*Primary Examiner* — Robert S Jones, Jr.
*Assistant Examiner* — Jiangtian Xu
(74) *Attorney, Agent, or Firm* — Hudak, Shunk & Farine Co. LPA

(57) ABSTRACT

The invention relates to a surfactant comprising a grafted rosin ester which is a rosin ester grafted with a capped polyalkylene glycol, wherein the capped polyalkylene glycol is a polyalkylene glycol capped by an alkyl ether and an aqueous dispersion consisting of an aqueous phase and resin particles dispersed in the aqueous phase, wherein the dispersion comprises the surfactant according to the invention.

14 Claims, No Drawings

SURFACTANT, DISPERSION AND ADHESIVE COMPOSITION

FIELD OF THE INVENTION

The present invention relates to a surfactant and to a process for the preparation thereof. The invention further relates to an aqueous dispersion comprising a resinous material and such surfactant, and to a process for the preparation thereof. The invention further relates to an adhesive composition comprising a polymer and such aqueous dispersion. The invention further relates to an article provided with such adhesive composition.

BACKGROUND OF THE INVENTION

US5552519 describes a surfactant made by esterifying a rosin, grafting the rosin ester with maleic anhydride and esterifying the grafted rosin ester with a non-capped polyethylene glycol. This surfactant is used for making an aqueous tackifier dispersion of rosin or hydrocarbons. In example 3 of U.S. Pat. No. 5,552,519, the dispersion has a solids content of 60.0%, a viscosity of 560 cps (Brookfield 3/50 rpm) and a mean particle size of 1.5 microns. A pressure sensitive adhesive comprising the aqueous tackifier dispersion is also disclosed.

WO2005077996 describes a tackifier dispersion made by dispersing a resinous material in the presence of an emulsifier made by reacting a reaction product of a linseed oil and maleic anhydride with polyethylene glycol. In the examples, the dispersion has a solids content of 50.0 to 55.6 wt %.

WO2014/200567 discloses a surfactant comprising a rosin ester grafted with a non-end capped polyethylene glycol. EP0296729 also discloses a rosin ester grafted with a non-end capped polyethylene glycol.

A high solids content of a dispersion is advantageous in that it allows reducing the costs of storage and transportation, since the same active content takes less volume. Increasing the solids content furthermore substantially reduces the energy cost during the coating and drying process. The solids content of a dispersion may be increased by using a reduced amount of water, but this increases the viscosity of the dispersion. A high viscosity creates handling problems for pumping and filtration. Also the stability of the dispersion is important.

There is accordingly a need in the art for a stable dispersion with a high solids content and an acceptable level of viscosity.

SUMMARY OF THE INVENTION

It is an object of the present invention to provide a dispersion in which the above-mentioned and/or other needs are met.

The present invention provides a surfactant comprising a grafted rosin ester which is a rosin ester grafted with a capped polyalkylene glycol, wherein the capped polyalkylene glycol is a polyalkylene glycol end-capped by an alkyl ether.

It has been found by the inventor that the surfactant according to the invention allows preparation of a stable dispersion having a high solids content and an acceptable level of viscosity. Accordingly, the invention further provides an aqueous dispersion comprising a resinous material and the surfactant according to the invention.

DETAILED DESCRIPTION OF THE INVENTION

Surfactant Comprising Grafted Rosin Ester

The surfactant comprises or is a grafted rosin ester.

Rosin Ester

Preferably, the rosin ester has an acid value of less than 30 mg KOH/g, more preferably less than 25 mg KOH/g, more preferably less than 20 mg KOH/g, more preferably less than 15 mg KOH/g. Herein the acid value is in mg KOH/g (titration). Preferably, the rosin ester has a softening point (ring and ball) of −30° C. to 140° C.

The rosin ester is prepared by (1) esterifying a rosin with a monohydric or polyhydric alcohol, preferably a polyhydric alcohol.

Rosin is a natural product consisting of mixed unsaturated acids. The rosin acids are mainly monobasic carboxylic acids containing the phenanthrene skeleton with 20 carbon atoms in the molecule. The difference between the acids is the number and position of the double bonds. Natural rosin may be classified due to its origin namely as gum rosin, wood rosin or tall oil rosin. The surfactant according to the invention can be prepared from any of these rosins or from mixtures thereof.

The rosin may be a non-disproportionated rosin or a disproportionated rosin. Disproportionation is a method of stabilizing the rosin. It involves transferring hydrogen atoms from one molecule of abietic acid to another. It is carried out by heating a rosin at 100° C. to 300° C. in the presence of a disproportionation catalyst. Examples of disproportionation catalyst are supported or non supported metals such as palladium, nickel and platinum, iodine, iodides such as iron iodide, $SO_2$ and sulphides such as iron sulphide. The catalyst is employed in the amount of 0.01% to 5 wt % on the basis of the amount of a rosin employed. The disproportionated rosin prepared in the above manner has preferably a content of abietic add of not more than 5 wt %.

Preferably, the alcohol for esterifying the rosin is a polyhydric alcohol, preferably a straight or branched chain non aromatic polyhydric alcohol containing 2 to 18 carbon atoms. Suitable alcohols are glycols such as triethylene glycol, diethylene glycol, polyalkylene glycol, glycerol, trimethylolethane, trimethylolpropane, pentaerythritol, diglycerol, dipentaerythritol, mannitol, sorbitol, hexitol, decanol and methanol. Triethylene glycol, glycerol and pentaerythritol are preferred. The alcohols may be employed alone or in combination.

The alcohol is preferably employed in such an amount that the ratio of the hydroxyl equivalents of the alcohol to the carboxyl equivalents of the rosin is in the range from 1.0:1.0 to 1.5:1.0.

The esterification of the rosin can be carried out by usual methods for instance, it is carried out by heating rosin with a mono or polyhydric alcohol in a closed or open reaction vessel in the presence or absence of an esterifying catalyst and in the presence of or absence of a solvent at 180° C. to 300° C., preferably 200° C. to 290° C. for 1 hour to 20 hours, preferably 5 to 15 hours.

Examples of esterifying catalysts employed if desired are acidic catalysts such as sulphuric acid, acetic acid, hypophosphorous acid and p-toluene sulphonic acid, alkaline earth metal hydroxides such as calcium hydroxide, metal oxides such as magnesium oxide and calcium oxide, carbonates such as calcium carbonate and acetates such as magnesium acetate and calcium acetate.

Capped Polyalkylene Glycol

The capped polyalkylene glycol is a polyalkylene glycol end-capped by an alkyl ether. This may also be referred as poly(alkylene glycol) alkyl ether.

Preferably, the polyalkylene glycol is selected from the group consisting of C2-C5 polyalkylene glycols and mixtures thereof, more preferably the group consisting of polyethylene glycol and polypropylene glycol and a mixture thereof. Most preferably, the polyalkylene glycol is or comprises polyethylene glycol.

Preferably, the alkyl ether has 1 to 18 carbon atoms, preferably 1 to 4 carbon atoms.

Most preferably, the capped polyalkylene glycol is methylether capped polyethylene glycol. For avoidance of any doubt, methylether capped polyethylene glycol (which may also be referred as polyethylene glycol) methyl ether) is represented by the following formula:

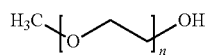

The average molecular weight of the end-capped polyalkylene glycol, determined by hydroxyl number analysis, is suitably from about 500 to about 16000 or to about 12000 and preferably more than 650. Preferably the molecular weight is from about 1000 to about 8000, most preferably from about 1500 to about 6000. It is also suitable to use a mixture of one polyalkylene glycol of a higher molecular weight with another with a lower molecular weight. In such cases the polyalkylene glycol may be a mixture of a polyalkylene glycol having an average molecular weight, determined by hydroxyl number analysis, of suitably from about 500 to about 2500, preferably from about 1000 to about 2000, and a polyalkylene glycol having an average molecular weight of suitably from about 3000 to about 8000, preferably from about 3500 to about 6000.

Preferably, the molar ratio between the rosin ester and the capped polyalkylene glycol in the grafted rosin ester is 0.05:1 to 1:1.

Process for Preparation of Surfactant

The invention further provides a process for the preparation of the surfactant according to the invention.

The process for the preparation of the surfactant according to the invention comprises the steps (2a) and (3a) or (2b) and (3b) as described below, and may further comprise the step of (1) esterifying a rosin with an alcohol.

In some embodiments, the process for the preparation of the surfactant according to the invention comprises
(2a) grafting the rosin ester with an unsaturated carboxylic acid or anhydride; and
(3a) esterifying the product obtained by step (2a) with the capped polyalkylene glycol to obtain the grafted rosin ester.

In step (2a), the esterified rosin is grafted with an unsaturated carboxylic acid or anhydride. Preferably the carboxylic acid is an α-β ethylenically unsaturated acid which is grafted onto the rosin by reaction with the unsaturation in the rosin acids. A common reaction between the unsaturated acid and the rosin acid is the fortification reaction. In this reaction a Diels-Alder adduct is formed from a conjugated double bond of the rosin acid and the α-β unsaturated carboxylic acid or anhydride. As suitable acids can be mentioned fumaric acid and its half esters, maleic acid (and anhydride) and its half esters, acrylic acid, methacrylic acid and related acryl and aryl acids, itaconic acid (and anhydride), and oligomers and copolymers of acrylics and vinyls with ethylenically unsaturated acids styrene/acrylic acids copolymer, etc). The fumaric acid and maleic acid (and anhydride) are the preferred ones.

Preferably, the unsaturated carboxylic acid is reacted in the mole ratio of 0.05:1 to 1.5:1, preferably 0.2:1 to 0.8:1 with each rosin associated with a rosin ester, i.e, a pentaerythritol rosin ester has a maximum of 4 rosins associated with it, whilst a glycerol ester has a maximum of 3. Preferably, the final acid value is at least greater than 30. Preferably, the reaction temperature is from about 170 to about 220° C.

In step (3a), the rosin ester grafted with the unsaturated carboxylic acid or anhydride obtained by step (2a) is further esterified with the capped polyalkylene glycol. Preferably, the capped polyalkylene glycol is suitably reacted in the mole ratio of 0.2:1-1:1 with each free carboxylic group, so that the final acid value is less than 30 mg KOH/g and preferably less than 25 mg KOH/g, more preferably less than 20 mg KOH/g, more preferably less than 15 mg KOH/g.

The reaction of (3a) is suitably undertaken at a temperature of between 180° C. to 300° C., preferably at 240° C. to 290° C. for 1 hour to 20 hours, preferably 5 to 15 hours in the presence of a catalyst. As suitable catalysts can be mentioned acidic catalysts such as sulphuric acid, acetic acid, hypophosphorous acid and p-toluene sulphonic acid, alkaline earth metal hydroxides such as calcium hydroxide, metal oxides such as magnesium oxide and calcium oxide, carbonates such as calcium carbonate and acetates such as magnesium acetate and calcium acetate.

In some embodiments, the reaction between the carboxylic groups of the unsaturated acid/anhydride and the capped polyalkylene glycol is carried out first and the grafting of the esterified rosin is carried out with the capped polyalkylene glycol ester of the unsaturated acid/anhydride. This manner of production gives a lower yield than the first reaction mode but it is a possible way of production.

Accordingly, in these embodiments, the process for the preparation of the surfactant according to the invention comprises the steps of:
(2b) esterifying an unsaturated carboxylic acid or anhydride with the capped polyalkylene glycol;
(3b) grafting the rosin ester with the product of step (2b) to obtain the grafted rosin ester.

Suitable examples of the unsaturated carboxylic acid or anhydride in step (2b) are mentioned in relation to step (2a).

Preferably, the mole ratio between glycol and free carboxylic acid group or anhydride in step (2b) is from 0.2:1 to 1:1.

In step (3b), the rosin ester is grafted with the product of step (2b) to obtain the grafted rosin ester.

Preferably, the mole ratio of the product of step (2b) and the rosin ester in step (3b) is from 0.05:1 to 1.5:1.

Aqueous Dispersion

The invention further provides an aqueous dispersion comprising an aqueous phase and resin particles dispersed in the aqueous phase, wherein the dispersion comprises the surfactant according to the invention. The dispersion is a stable oil in water emulsion.

The invention further provides use of the surfactant according to the invention as a dispersing agent for preparing an aqueous dispersion of resin particles, Resin Particles The resin particles are particles made of a resinous material and the surfactant according to the invention. Preferably, the resinous material is selected from the group consisting of a hydrocarbon resin, an alkyd resin, a polyamide resin, a rosin resin and mixtures thereof. Suitable hydrocarbon resins include aliphatic or aromatic hydrocarbon resins derived from respectively C5 feed streams and C9 feed streams, DCPD resins, terpene resins, terpene/phenol resins and cumarone/indene resins.

The resinous material is preferably a rosin resin. Rosin comprises rosin acids which are mainly a mixture of C20 monobasic carboxylic acids containing a phenanthrene skeleton. The rosin resin can be an unmodified rosin or a modified rosin. There are many different ways of modifying rosin. The rosin can be partially fortified or esterified. Preferably, the rosin resin is a glycerol, pentaerythritol or triethylene glycol ester of a rosin acid. The rosin can be dimerized or treated with paraformaldehyde in the presence of paratoluene sulphonic acid to inhibit crystallization or it can be stabilized by disproportionation which involves transferring hydrogen atoms from one molecule of abietic acid to another. This is suitably carried out by heating rosin at from about 100° C. to about 300° C. in the presence of a disproportionation catalyst. Examples of disproportionation catalysts are: supported or non-supported metals such as palladium, nickel and platinum iodine, iodides such as iron iodide, sulphur dioxide and sulphides such as iron sulphide. The catalyst is suitably employed in an amount of from about 0.01% to about 5 wt % on the basis of the amount of rosin employed. The disproportionated rosin prepared in the above manner has preferably a content of abietic acid of not more than about 5 wt %.

Rosins partially saponified with sodium or potassium hydroxide or with a volatile base (e. g. ammonia or a lower amine such as triethanolamine) are also useful. The dispersion according to the invention can comprise any of the above described rosin resins or mixtures thereof.

Preferably, the dispersion has a solids content of at least 61 wt %, more preferably at least 62 wt %, more preferably at least 63 wt %, more preferably at least 64 wt %, more preferably at least 65 wt %.

Preferably, the dispersion has a Brookfield viscosity measured using spindle 3 and operated at 50 rpm at 20° C. of at most 2000 mPa's, for example from 100 to 2000 mPa·s, more preferably 150 to 1500 mPa·s, more preferably 200 to 1200 mPa's, more preferably 250 to 700 mPa·s. Such viscosity is suitable for the handling of the dispersion, especially during the production process of an adhesive composition using the dispersion.

Preferably, the amount of the surfactant according to the invention with respect to the resinous material in the dispersion is about 1 to about 8 wt %, more preferably from about 2 to about 6 wt %.

The dispersion may further comprise a conventional anionic emulsifier. Suitably, the anionic emulsifier may be selected from the group consisting of alkyl aryl sulphonates, such as sodium or ammonium alkyl benzene sulphonates, fatty alcohol sulphates, e. g. sodium lauryl sulphate, phosphate esters, e. g. sodium salts of mono- and di-esters of orthophosphoric acid, esters of sulphosuccinic acid, sodium salts of sulphate monoglycerides and sulphonates or sulphosuccinates of alkyl phenol polyoxyalkylene oxide condensates or of polyoxyalkylene oxide condensates, e.g. the ammonium salt of nonylphenol polyalkylene oxide sulphonic acid or the ammonium salt of fatty alcohol polyalkylene oxide sulphate ester.

When present, the amount of the optional anionic emulsifier with respect to the amount of the resinous material in the dispersion preferably is at least 0.1 wt % with respect to the resinous material. It was found that a larger amount of the optional anionic emulsifier leads to an increase in the viscosity of the dispersion. Accordingly, the amount of the optional anionic emulsifier with respect to the resinous material is at most 3.0 wt %, at most 2.5 wt %, at most 2.0 wt %, at most 1.5 wt %, at most 1.0 wt % or at most 0.5 wt %.

Preferably, the resin particles have a mean particle diameter d50 of less than about 1.2 microns, preferably less than about 1 micron, preferably less than about 0.9 micron, preferably less than about 0.7 microns, more preferably less than about 0.5 microns, most preferably less than about 0.45 microns. d50 means the mean particle diameter for the 50 weight % fraction of the particles starting from the smallest particles. Such particle size is suitable for obtaining a stable dispersion.

Preferably, the particles have a multimodal particle size distribution, preferably a bimodal particle size distribution. This leads to a decrease in the viscosity of the dispersion, which allows a higher solids content of the dispersion.

The term "multimodal particle size distribution" means that the particle size distribution has multiple peaks. The term "bimodal particle size distribution" means that the particle size distribution has two peaks. Multimodal (bimodal) particle size distribution may be obtained e.g. by mixing a plurality of (two) dispersion having different particle size distributions.

Preferably, the dispersion having the bimodal particle size distribution is obtained by mixing two dispersions having different d50 values wherein the difference in the d50 values is at least 0.2 microns.

Preferably, the total amount of the resinous material, the surfactant according to the invention, the optional anionic emulsifier and water in the dispersion is at least 95 wt %, at least 97 wt %, at least 98 wt %, at least 99 wt % or 100 wt % with respect to the dispersion.

The dispersion according to the invention preferably has a storage stability (shelf life) of at least about six months and will suitably demonstrate no substantial separation, coagulation or deposition. It is also preferred that the dispersion is low foaming and have good mechanical stability during pumping, transportation and mixing, as well as low foaming and good stability when formulated in an adhesive composition and during coating of the adhesive composition, Process for Preparation of Aqueous Dispersion The invention further provides a process for the preparation of the aqueous dispersion according to the invention, comprising the steps of mixing a melt of the resinous material and the surfactant and adding water.

When preparing the dispersion according to the invention, the resinous material is suitably first melted and the surfactant according to the invention is added, suitably as a melted substance or as present in an aqueous solution.

The optional anionic emulsifier may be mixed with the melt of the resinous material and the surfactant.

Optionally, an alkaline substance such as sodium hydroxide, potassium hydroxide, amine or ammonia may be mixed with the melt of the resinous material and the surfactant.

Sufficient hot water, suitably from about 5 to about 15 wt %, based on the weight of resinous material, is stirred in to form a creamy water in oil emulsion. Upon further dilution with water, for example 35 to 75 wt % with respect to the resinous material, the emulsion inverts to provide a stable oil in water emulsion. Part of water may evaporate during the process, resulting in the final aqueous dispersion.

Adhesive Composition

The invention further provides an adhesive composition comprising a polymer latex and the aqueous dispersion according to the invention, preferably a pressure sensitive adhesive composition.

The invention further provides use of the aqueous dispersion according to the invention as a tackifier in an adhesive composition comprising a polymer, preferably a pressure sensitive adhesive composition comprising a polymer.

Preferably, the polymer latex is a latex of a polymer selected from the group consisting of natural or synthetic rubbers or elastomers such as styrene-butadiene copolymers, natural rubbers. polychloroprene, acrylonitrile-butadiene or alternatively latices derived from various acrylic or vinyl latices such as ethyl hexyl acrylate, butyl acrylate, methyl methacrylate, ethyl acrylate copolymers, ethylene vinyl acetates etc.

The adhesive composition may be prepared by blending the dispersion with a latex or combination of latices using conventional blenders to provide a homogenous mixture in an amount of 20 to 150 parts by weight per 100 parts of dry polymer in the latex, preferably 20 to 100 parts by weight per 100 parts of dry polymer.

The prepared adhesive can be coated on a suitable carrier and dried. As suitable carriers can be mentioned, in the case of tapes and labels, a non woven material e.g. paper, a woven material e.g. cotton; a homopolymer of an unsaturated monomer such as ethylene, propylene or vinyl chloride or the carrier can be of polyester or polyamide.

The adhesive composition is applied to the carrier by conventional coating techniques such as curtain coaters, roller coaters, blade coaters, meyer rods or air coaters and dried by passing through a heating tunnel or oven. The adhesive coat is either applied directly or by transfer coating.

The dry coat weight is suitably from 15 to 70 gsm. For packaging tapes and label applications the dry coat weight is generally from 15 to 30 gsm and for masking tapes about 30 to 60 gsm.

The invention further provides an article obtained by or obtainable by applying the adhesive composition according to the invention on a carrier and drying the adhesive composition, preferably wherein the article is an adhesive tape or an adhesive label.

In the present specification, the solids content of the dispersion is determined by placing 2.0 g of the dispersion in an aluminium dish in a convection oven at 135° C. for 45 minutes, cooling the dish to room temperature and weighing the dish.

In the present specification, the particle size distribution and d50 of the dispersion is determined by laser diffraction method using COULTER LS 230.

In the present specification, the viscosity of the dispersion is a Brookfield viscosity measured using spindle 3 and operated at 50 rpm (up to 2000 mPa·s), 30 rpm (2000 to 5000 mPa·s) or 10 rpm (above 5000 mPa·s) at 20° C., which is defined as the result of the Brookfield-Viscosimeter-scale multiplied by a factor, which is given on the Factor-Finder-card using a specified spindle and R.P.M.

It is noted that the invention relates to the subject-matter defined in the independent claims alone or in combination with any possible combinations of features described herein, preferred in particular are those combinations of features that are present in the claims. It will therefore be appreciated that all combinations of features relating to the composition according to the invention; all combinations of features relating to the process according to the invention and all combinations of features relating to the composition according to the invention and features relating to the process according to the invention are described herein.

It is further noted that the term 'comprising' does not exclude the presence of other elements. However, it is also to be understood that a description on a product/composition comprising certain components also discloses a product/composition consisting of these components. The product/composition consisting of these components may be advantageous in that it offers a simpler, more economical process for the preparation of the product/composition. Similarly, it is also to be understood that a description on a process comprising certain steps also discloses a process consisting of these steps. The process consisting of these steps may be advantageous in that it offers a simpler, more economical process.

When values are mentioned for a lower limit and an upper limit for a parameter, ranges made by the combinations of the values of the lower limit and the values of the upper limit are also understood to be disclosed.

The invention is now elucidated by way of the following examples, without however being limited thereto.

Parts mentioned below are all parts by weight.

Example 1

200 grams rosin was heated under nitrogen blanket at 280° C. with constant agitation in combination with 30 g glycerol for 10 hours to obtain a product of acid value 10 mg KOH/g and softening point ring and ball 88° C.

200 grams of the above glycerol ester was cooled to 180° C. and reacted with 20 g maleic anhydride for 4 hours, until the water soluble acid value was less than 5 mg KOH/g, to obtain a product of acid value 63 mg KOH/g and softening point ring and ball 134° C.

This product was further reacted with 560 g methylether capped polyethylene glycol with Mw of 5000 at 260° C. for 6 hours, to obtain a product of acid value 14 mg KOH/g and softening point ring and ball 62° C.

Example 2. Comparative 200 grams rosin was heated under nitrogen blanket at 280° C. with constant agitation in combination with 30 g glycerol for 10 hours to obtain a product of acid value 10 mg KOH/g and softening point ring and ball 88° C.

200 grams of the above glycerol ester was cooled to 180° C. and reacted with 20 g maleic anhydride for 4 hours, until the water soluble acid value was less than 5 mg KOH/g, to obtain a product of acid value 63 mg KOH/g and softening point ring and ball 134° C.

This product was further reacted with 570 g polyethylene glycol with Mw of 4000 at 260° C. for 6 hours, to obtain a product of acid value 12 mg KOH/g and softening point ring and ball 61° C.

Example 3

100 parts of glycerol ester of rosin (AV=12 mg KOH/g, softening point ring and ball is 75° C.), 4 parts of the surfactant of example 1, 0.40 parts NaOH solution (50% solids in water), 1.7 parts fatty alcohol ether sulphate salts surfactant (29% solids in water) were molten with stirring in a pot. Subsequently 70 parts water was added with stirring.

Finally the dispersion was cooled to room temperature, obtaining a stable dispersion of a uni-modal mean particle size d50 of 0.7 microns. The Brookfield viscosity measured using spindle 3 and operated at 50 rpm at 20° C. was 1470 mPa·s and the solids content was 64 wt %. The dispersion had a minimum 6 months shelf storage stability, low foaming characteristics and good mechanical stability.

Example 4

100 parts of glycerol ester of rosin (AV=12 mg KOH/g, softening point ring and ball is 75° C.), 4 parts of the surfactant of example 1, 0.40 parts NaOH solution (50% solids in water), 10.3 parts fatty alcohol ether sulphate salts surfactant (29% solids in water) were molten with stirring in a pot. Subsequently 65 parts water was added with stirring.

Finally the dispersion was cooled to room temperature, obtaining a stable dispersion of a uni-modal mean particle size d50 of 0.3 microns. The Brookfield viscosity measured using spindle 3 and operated at 10 rpm at 20° C. was 5000 mPa·s and the solids content was 64 wt %. The dispersion had a minimum 6 months shelf storage stability, low foaming characteristics and good mechanical stability.

Example 5. Comparative 100 parts of glycerol ester of rosin (AV=12 mg KOH/g, softening point ring and ball is 75), 0.40 parts NaOH solution (50% solids in water), 1.7 parts fatty alcohol ether sulphate salts surfactant (29% solids in water) were molten with stirring in a pot. Subsequently 90 parts water was added with stirring.

Finally the dispersion was cooled to room temperature, obtaining a dispersion of mean particle size d50 of 1.6 microns. The Brookfield viscosity measured using spindle 3 and operated at 50 rpm at 20° C. was 120 mPa·s and the solids content was 56 wt %. The dispersion showed phase separation by reverse creaming within 2 weeks. The dispersion showed low mechanical stability as measured by Hamilton Beach stirring.

Example 6. Comparative 100 parts of glycerol ester of rosin (AV=12 mg KOH/g, softening point ring and ball is 75), 0.40 parts NaOH solution (50% solids in water), 10.3 parts fatty alcohol ether sulphate salts surfactant (29% solids in water) were molten with stirring in a pot. Subsequently 85 parts water was added with stirring.

Finally the dispersion was cooled to room temperature, obtaining a stable dispersion of a mean particle size 1.1 microns. The Brookfield viscosity measured using spindle 3 and operated at 50 rpm at 20° C. was 310 mPa·s and the solids content was 55 wt %. The dispersion showed phase separation by reverse creaming within 2 weeks. The dispersion showed low mechanical stability as measured by Hamilton Beach stirring.

Example 7. Comparative 100 parts of glycerol ester of rosin (AV=12 mg KOH/g, softening point ring and ball is 75), 4 parts of the surfactant of example 2, 0.40 parts NaOH solution (50% solids in water), 1.7 parts fatty alcohol ether sulphate salts surfactant (29% solids in water) were molten with stirring in a pot. Subsequently 75 parts water was added with stirring.

Finally the dispersion was cooled to room temperature, obtaining a stable dispersion of a uni-modal mean particle size d50 of 0.45 microns. The Brookfield viscosity measured using spindle 3 and operated at 10 rpm at 20° C. was 8590 mPa·s and the solids content was 59 wt %. The dispersion had good shelf storage stability, low foaming characteristics and good mechanical stability.

Example 8. Comparative 100 parts of glycerol ester of rosin (AV=12 mg KOH/g, softening point ring and ball is 75), 4 parts of the surfactant of example 2, 0.40 parts NaOH solution (50% solids in water), 10.3 parts fatty alcohol ether sulphate salts surfactant (29% solids in water) were molten with stirring in a pot. Subsequently 70 parts water was added with stirring.

Finally the dispersion was cooled to room temperature, obtaining a stable dispersion of a uni-modal mean particle size d50 of 0.35 microns. The Brookfield viscosity measured using spindle 3 and operated at 10 rpm at 20° C. was 5848 mPa·s and the solids content was 60%. The dispersion had good shelf storage stability, low foaming characteristics and good mechanical stability.

In example 1 and comparative experiment 2, a polymeric surfactant was made. In example 1, a rosin ester grafted with an end capped PEG was made according to the invention. In comparative example 2, a rosin ester grafted with a non-end capped PEG was made, as in U.S. Pat. No. 5,552,519.

In examples 3 and 4 according to the invention, the surfactant obtained by example 1 was used to prepare an aqueous dispersion. The dispersions were stable. The dispersions had high solids content and their viscosities were sufficiently low. The comparison of examples 3 and 4 shows that a lower amount of the fatty alcohol ether sulphate salt surfactant leads to a lower viscosity.

In comparative examples 5 and 6, aqueous dispersions were made without the surfactant obtained by example 1 or the surfactant obtained by example 2. The dispersion had low solids content and were unstable.

In comparative examples 7 and 8, the surfactant obtained by comparative example 2 was used to prepare an aqueous dispersion. The dispersions were stable. However, the dispersions had low solids content and their viscosities were high.

The comparison of example 4 vs comparative experiment 7 and example 5 vs comparative experiment 8 shows that the use of an end capped PEG instead of a non-end capped PEG allows the preparation of a stable aqueous dispersion having a high solids content and a low viscosity.

The invention claimed is:

1. A surfactant, comprising:
   a grafted rosin ester which is a rosin ester grafted with a capped polyethylene glycol, wherein the capped polyethylene glycol is a end-capped by an alkyl ether, wherein the capped polyethylene glycol has a Mw of 2000 to 8000, and wherein the alkyl ether has 1 to 4 carbon atoms.

2. The surfactant according to claim 1, wherein the molar ratio between the rosin ester and the capped polyethylene glycol is 0.05:1 to 1:1.

3. A process for the preparation of the surfactant according to claim 1, comprising the steps of: (2a) grafting the rosin esterwith an unsaturated carboxylic acid or anhydride, and (3a) esterifying the product obtained by step (2a) with the capped polvethylene glycol to obtain the grafted rosin ester; or (2b) esterifying an unsaturated carboxylic acid or anhydride with the capped polyethylene glycol, and (3b) grafting the rosin ester with the product of step (2b) to obtain the grafted rosin ester.

4. The process according to claim 3, further comprising the step of: (1) esterifying a rosin with an alcohol.

5. The process according to claim 3, wherein the unsaturated carboxylic acid or anhydride is selected from the group consisting of maleic acid, maleic anhydride, fumaric acid or mixtures thereof.

6. An aqueous dispersion comprising an aqueous phase and resin particles dispersed in the aqueous phase, wherein the dispersion comprises the surfactant according to claim 1.

7. The aqueous dispersion according to claim 6, wherein the resin particles are made of a resinous material and the surfactant, wherein the resinous material is selected from the group consisting of a hydrocarbon resin, an alkyd resin, a polyamide resin, a rosin resin and mixtures thereof.

8. The aqueous dispersion according to claim 6, wherein the dispersion has a solids content of at least 61 wt. %.

9. The aqueous dispersion according to claim 6, wherein the dispersion has a Brookfield viscosity measured using spindle 3 and operated at 50 rpm at 20° C. of at most 2000 mPa·s.

10. The aqueous dispersion according to claim 6, further comprising an anionic emulsifier, wherein the amount of the anionic emulsifier is with respect to the resinous material is at most 3.0 wt. %, at most 2.5 wt. %, at most 2.0 wt. %, at most 1.5 wt. %, at most 1.0 wt. % or at most 0.5 wt. %.

11. The aqueous dispersion according to claim 6, wherein the particles have a multimodal particle size distribution.

12. A process for the preparation of the aqueous dispersion according to claim 6, comprising the step of mixing a melt of the resinous material, the surfactant and water.

13. An adhesive composition comprising a polymer latex and the aqueous dispersion according to claim 6.

14. An article obtained by or obtainable by applying the adhesive composition according to claim 13 on a carrier and drying the adhesive composition.

* * * * *